3,814,737
ETHYLENE-ACRYLIC ACID POLYMERS HAVING
IMPROVED OPTICAL CHARACTERISTICS
Ronald E. Gilbert, Orange, Tex., Joseph W. Jones, Jr.,
Leawood, Kans., and Raymond M. Henry, Gibsonia,
Pa., assignors to Gulf Research & Development Company, Pittsburgh, Pa.
No Drawing. Continuation-in-part of application Ser. No.
77,027, Sept. 30, 1970. This application Aug. 14, 1972,
Ser. No. 280,250
Int. Cl. C08f 15/02
U.S. Cl. 260—80.73          2 Claims

ABSTRACT OF THE DISCLOSURE

A fractional precipitation process is employed to substantially improve the optical properties of ethylene-acrylic acid polymers.

REFERENCE TO RELATED APPLICATIONS

This application is a continuation-in-part of our copending application, Ser. No. 77,027, filed Sept. 30, 1970, now abandoned.

BACKGROUND OF INVENTION

Ethylene-acrylic acid polymers have been found to be of particular value in the preparation of laminated glass structures which are employed as safety glass in automobiles and in the construction of buildings. It will be appreciated that in the construction of such laminated glass structures that the ethylene-acrylic acid polymer employed as an inner layer must have very good optical characteristics. For example, the optical characteristic identified as haze—which measures the frosty appearance of transmitted light through the ethylene-acrylic acid polymer—must be very low.

Ethylene-acrylic acid polymers which have been found to be particularly suitable in the preparation of laminated glass structures are random copolymer of ethylene-acrylic acid and normally contain from 0.06 to 0.5 mol of acrylic acid per mol of contained ethylene. These ethylene-acrylic acid polymers can be prepared by processes such as described in U.S. Pat. 3,485,785 and in Canadian Pat. 889,920. Laminated glass structures prepared from such ethylene-acrylic acid copolymers normally have a haze of 3 to 24 percent, as measured by the Gardner hazemeter. This is contrasted to an acceptable haze reading of less than 2 percent for safety glass employed in the fabrication of automobiles.

Accordingly, an object of the invention is to provide an ethylene-acrylic acid polymer having improved optical characteristics.

Another object of the invention is to provide an ethylene-acrylic acid film having improved optical characteristics.

Yet another object of the invention is to provide a laminated glass structure containing an ethylene-acrylic acid polymer inner layer having substantially improved haze.

Other objects, advantages and features of the invention will be readily apparent to those skilled in the art from the following description and appended claims.

SUMMARY OF INVENTION

By the invention a film having substantially improved haze is prepared from an ethylene-acrylic acid polymer by dissolving the ethylene-acrylic acid polymer in a mixed solvent under conditions of heating and stirring, admixing therewith a nonsolvent and permitting the admixture to cool to ambient temperatures, separating a formed precipitate therefrom, and thereafter precipitating and recovering an ethylene-acrylic acid polymer from the admixture.

DESCRIPTION OF THE INVENTION

The invention is directed to the fractional precipitation of random ethylene-acrylic acid polymers. The ethylene-acrylic acid polymers will contain from about 0.06 to about 0.5 mol and preferably from about 0.08 to about 0.25 mol of acrylic or methacrylic acid per mol of contained ethylene. In addition to ethylene and acrylic acid monomers, the ethylene-acrylic acid polymers may contain minor portions of one or more additional monomers such as vinyl acetate, esters of the above-named acids, and amides such as acrylamide and methacrylamide.

In the practice of the invention, the ethylene-acrylic acid polymer is dissolved in a solvent at an elevated temperature. Solvents which have been found to be particularly effective in dissolving the ethylene-acrylic acid polymer are mixed solvents such as mixtures of xylene and acetic acid, and xylene and isopropyl alcohol. Of the named mixed solvents, normally xylene comprises from about 85 to 90 percent by volume of the mixed solvent. The solution of the ethylene-acrylic acid polymer in the solvent is normally effected at a temperature below the boiling point of the solvent but above 100° C. with even higher solution temperatures preferred to shorten the time required to place the polymer in solution.

After solution of the ethylene polymer has been completed, a nonsolvent can be added to the solution and the admixture permitted to cool to ambient temperature. A precipitate is formed which can be separated from the liquid medium by filtration. Infra-red analysis of the material removed by precipitation and filtration shows a strong 13.7$\mu$ band, indicating that at least a substantial portion of the material removed is highly crystalline.

The nonsolvent found to be particularly effective in the practice of the invention is Cellosolve. Other suitable nonsolvents include the glycols such as ethylene and propylene glycol. Generally, the volume of nonsolvent added to the polymer solution will range from 0.5 to 10 percent by volume of the polymer solution.

After the first formed precipitate has been separated from the liquid medium, a precipitating agent for the ethylene-acrylic acid polymer can be added to the polymer solution. Suitable precipitating agents include all alcohols such as methanol, ethanol, propanol and butanol and the low molecular weight ketones such as acetone and methyl ethyl ketone. Normally, the volume of precipitating agent employed in the second precipitation step will range from 50 percent to a volume equal to the volume of the polymer solvent.

The precipitated ethylene-acrylic acid polymer can be separated from the solvent by conventional means such as filtration. The recovered polymer when cast into a film by conventional processes has substantially superior haze characteristics when compared with the haze characteristics of ethylene-acrylic acid polymer films prepared by conventional processes. The term "haze" refers to that percentage of transmitted light which in passing through the specimen deviates from the incident beam by forward scattering. Only light flux deviating more than 2.5 degrees on the average is considered to be haze. As employed in this application, the haze test results refer to those results obtained by employing American Society for Testing and Materials (ASTM) Test Method D 1003–61. Infra-red analysis of the ethylene-acrylic acid polymer product produced by the fractional precipitation process of the invention shows the absence of a band at $13.7\mu$ and thus the absence of crystalline material from the polymer product.

The ethylene-acrylic acid polymers of this invention are particularly adaptable in the preparation of laminated glass structures which are employed as safety glass in automobiles and in the construction of buildings. The laminated glass structures are prepared by bonding together at least two glass laminae with the ethylene-acrylic acid polymer, thereby obtaining a laminated glass structure with an ethylene-acrylic acid polymer film layer as the inner layer.

A film layer of the product ethylene-acrylic acid polymer can be obtained by laying down an aqueous dispersion of the polymer on a substrate such as glass and evaporating the water therefrom or by melt extrusion of the ethylene-acrylic acid polymer employing procedures known to the art. Alternatively, an organic solvent solution of the ethylene-acrylic acid polymer can be laid down on a surface and the solvent evaporated therefrom.

The laminated glass structures can be prepared, for example, by placing films or tapes of the ethylene-acrylic acid polymer between two glass laminae before the laminae are subjected to heat and pressure. The laminates thus prepared are firmly bonded together and ordinarily cannot be separated without destroying at least one of the laminae. A film layer can also be obtained by distributing solid particles of the ethylene acrylic acid polymer on one lamina, placing a second lamina on top thereof, and, finally, heating the laminated structure under pressure.

The laminated glass structure containing the ethylene-acrylic acid polymer inner layer has surprisingly high impact strength, is more resistant to temperature change than glass laminae conventionally employed as safety glass in automobile windshields, for example, and, in addition, will by reason of this invention have optical characteristics substantially superior to those ethylene-acrylic acid polymer resins and other synthetic resins such as polyvinyl butyral conventionally employed in the manufacture of laminated glass structures.

It has been observed that laminated glass structures having an ethylene-acrylic acid polymer prepared by the fractional precipitation process of this invention will have a haze of less than 2 percent, as measured by the Gardner hazemeter employing ASTM D 1003–61, whereas laminated glass structures prepared employing synthetic resins known to the art will normally have a haze of 3 to 24 percent as measured by the Gardner hazemeter employing ASTM D 1003–61.

The following examples are presented to illustrate the objects and advantages of the invention. It is not intended, however, that the invention should be limited to the specific embodiments described therein.

EXAMPLE I

In this example, a glass laminated structure was prepared from glass panes measuring 1/8" in thickness, employing an ethylene-acrylic acid copolymer inner layer wherein the concentration of acrylic acid comonomer in the ethylene polymer was 17.5 weight percent. The ethylene-acrylic acid copolymer had been prepared by the thermal decomposition of an ethylene-isopropyl ester of acrylic acid copolymer with the thermal decomposition conducted in an extruder. The ethylene-acrylic acid inner film layer prepared by the melt extrusion of an ethylene-acrylic acid copolymer had a thickness of 30 mils. Haze measurements of the laminated structure made on a Gardner hazemeter and employing ASTM D 1003–61 showed that the laminated structure had a haze of 24.1 percent.

EXAMPLE II

In this example, the ethylene-acrylic acid copolymer of Example I prepared by the thermal decomposition of the ethylene-isopropyl ester of acrylic acid copolymer was dissolved in a xylene-acetic acid mixed solvent to obtain a polymer solution containing 2 weight percent of the ethylene-acrylic acid copolymer. The mixed solvent comprised 85 volume percent xylene and 15 volume percent acetic acid. The polymer solution was heated to a temperature of 130° C.

10 percent by volume (based upon the polymer solution) of Cellosolve was added to the solution of polymer and the resulting admixture was permitted to cool to ambient temperature. A precipitate was separated from the admixture by filtration and upon infra-red analysis showed the presence of a strong $13.7\mu$ band.

Methanol was then added to the polymer solution so as to form a mixture of 2 volumes of polymer solution and 1 volume of methanol. The ethylene-acrylic acid copolymer was precipitated from the solution and was separated from the liquid medium by filtration.

A glass laminated structure employing an extruded film layer of the product ethylene-acrylic acid polymer as an inner layer was prepared as described in Example I. Haze measurements of the laminated structure made on a Gardner hazemeter and employing ASTM D 1003–61 showed that the laminated structure had a haze of 0.9 percent.

Comparison of the results obtained in Examples I and II demonstrates the effectiveness of the invention to obtain an ethylene-acrylic acid copolymer film layer having substantially improved optical characteristics as determined by the measurement of haze.

Although the invention has been described with reference to specific materials, embodiments and details, various modifications and changes, within the scope of this invention, will be apparent to those skilled in the art and are contemplated to be embraced in the invention.

What is claimed is:

1. A process for preparing an ethylene-acid copolymer having improved optical properties which consist essentially of the steps of:

(1) Dissolving an ethylene-acid copolymer in a liquid mixed solvent at a temperature above 100° C.,
   (2) Admixing a non-solvent with the polymer solution from step (1) to precipitate a portion of the dissolved ethylene-acid copolymer,
   (3) Separating the precipitated polymer formed in step (2) and recovering a solution containing the still dissolved portion of ethylene-acid copolymer,
   (4) Adding a precipitating liquid to the polymer solution recovered from step (3) to precipitate the ethylene-acid copolymer, and
   (5) Recovering the precipitated ethylene-acid copolymer from step (4);

the ethylene-acid copolymer employed in step (1) being a copolymer consisting essentially of polymerized ethylene and an acid monomer selected from the group consisting of acrylic acid and methacrylic acid, said ethylene-acid copolymer containing from about 0.06 to about 0.5 mol of polymerized acid monomer per mol of polymerized ethylene monomer, any additional monomer optionally present in the ethylene-acid copolymer being present in a minor portion and being selected from the group consisting of esters of acrylic acid, esters of methacrylic acid, acrylamide, methacrylamide and vinyl acetate; the liquid mixed solvent employed in step (1) consisting essentially of xylene and a second solvent selected from the group consisting of acetic acid and isopropanol; the non-solvent employed in step (2) being selected from the group consisting of the glycols and Cellosolve; and the precipitating liquid employed in step (4) being selected from the group consisting of the 1–4 carbon alkanols, acetone and methyl ethyl ketone.

2. The process of claim 1 wherein said nonsolvent is Cellosolve.

References Cited

UNITED STATES PATENTS

| | | | |
|---|---|---|---|
| 3,520,861 | 7/1970 | Thomson et al. | 260—88.1 R |
| 3,658,741 | 4/1972 | Knutson et al. | 260—88.1 R |
| 3,255,166 | 6/1966 | Bernhardt et al. | 260—94.9 F |
| 3,711,456 | 1/1973 | Gilbert et al. | 260—88.1 R |

HARRY WONG, Jr., Primary Examiner

U.S. Cl. X.R.

161—203; 260—29.6 R, 31.2 R, 33.4 R, 33.6 UA, 80.8, 88.1 R